A. R. PULLEN.
METHOD OF PROPELLING SHIPS AND BOATS AND APPARATUS THEREFOR.
APPLICATION FILED MAY 21, 1913.
1,116,117.
Patented Nov. 3, 1914.
17 SHEETS—SHEET 1.
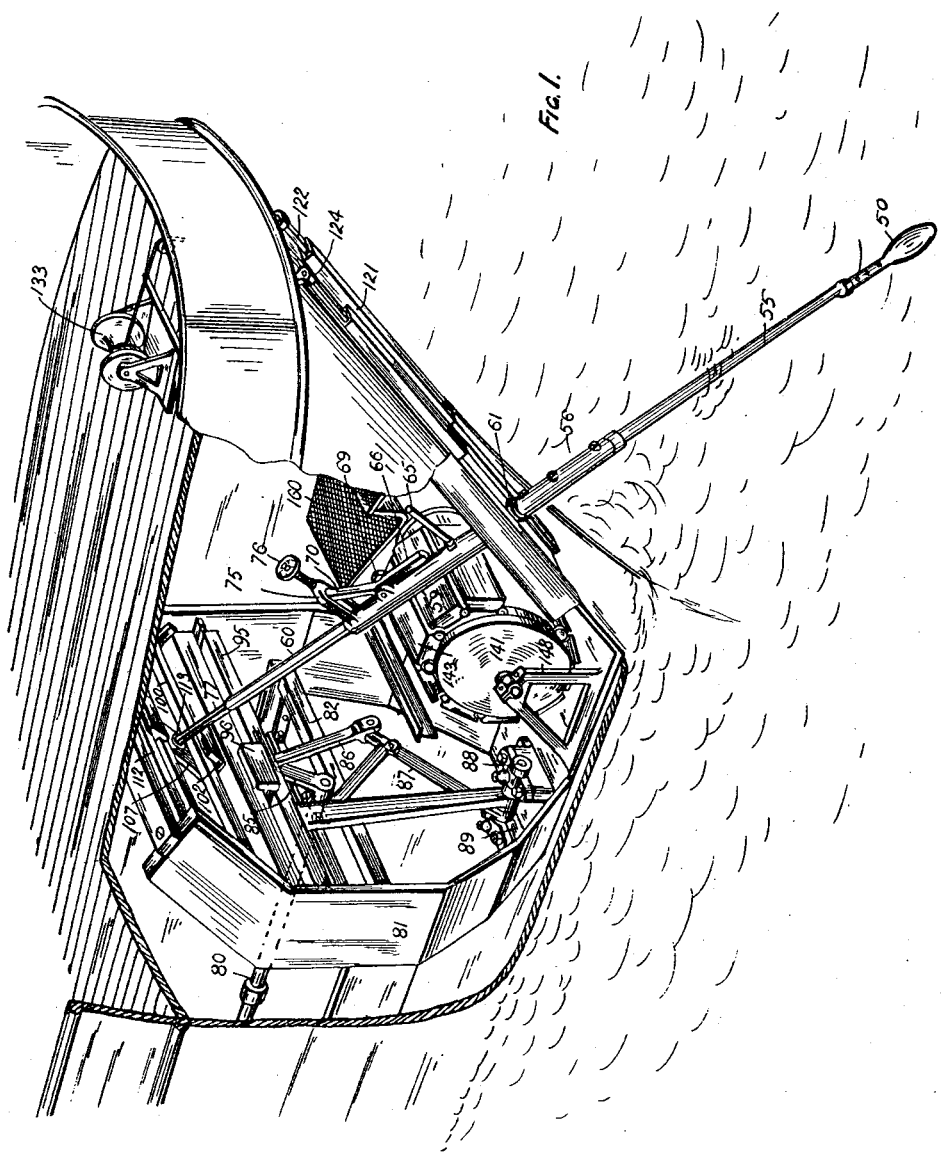

A. R. PULLEN.
METHOD OF PROPELLING SHIPS AND BOATS AND APPARATUS THEREFOR.
APPLICATION FILED MAY 21, 1913.
1,116,117.
Patented Nov. 3, 1914.
17 SHEETS—SHEET 2.
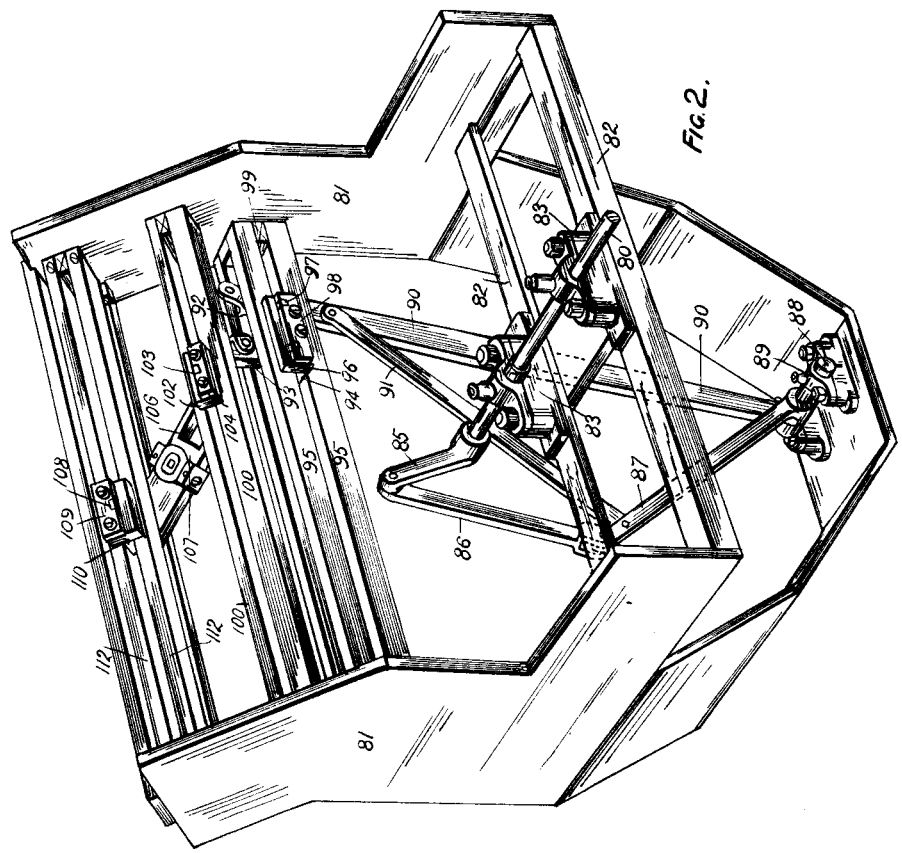

A. R. PULLEN.
METHOD OF PROPELLING SHIPS AND BOATS AND APPARATUS THEREFOR.
APPLICATION FILED MAY 21, 1913.
1,116,117.
Patented Nov. 3, 1914.
17 SHEETS—SHEET 3.
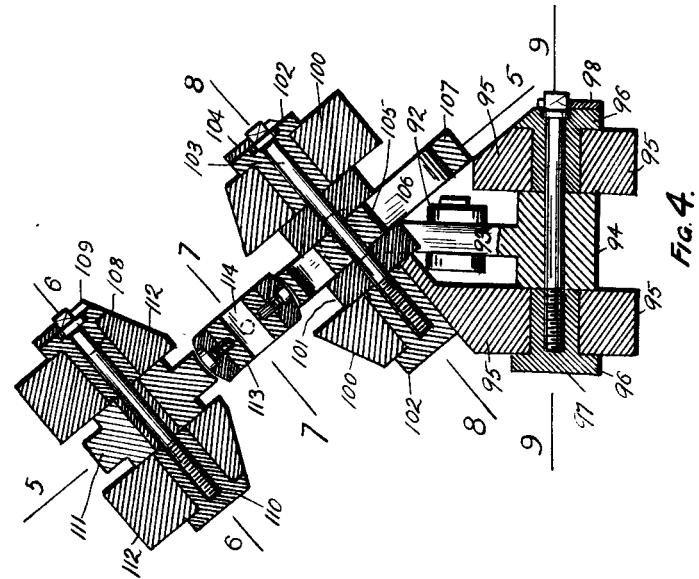
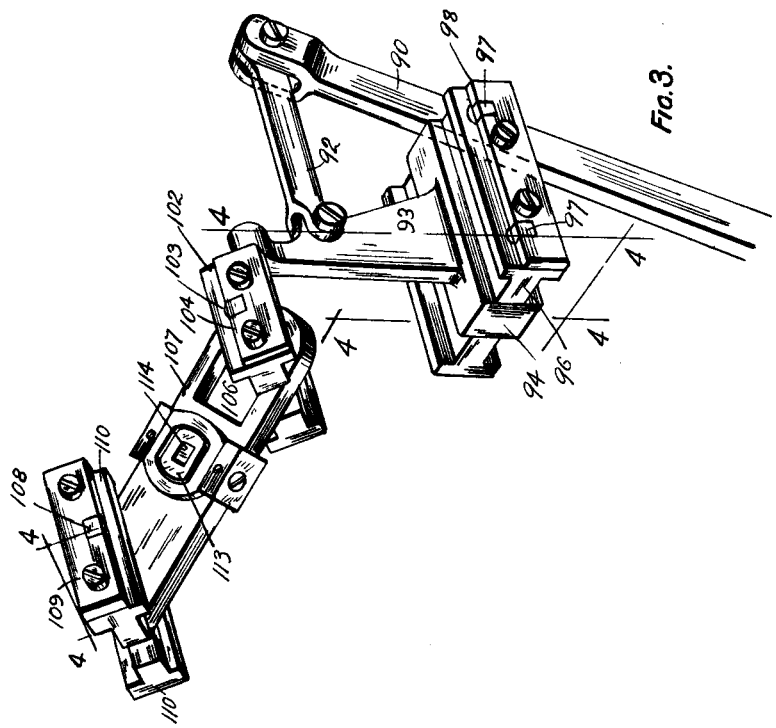
WITNESSES:
John Sanders
Albert F. Heuman
INVENTOR:
Alfred Roberto Pullen
BY M. Wallau White
ATT'Y.

A. R. PULLEN.
METHOD OF PROPELLING SHIPS AND BOATS AND APPARATUS THEREFOR.
APPLICATION FILED MAY 21, 1913.
1,116,117.
Patented Nov. 3, 1914.
17 SHEETS—SHEET 4.
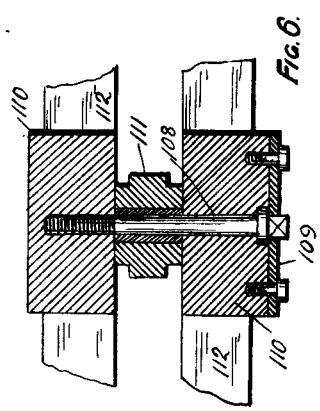
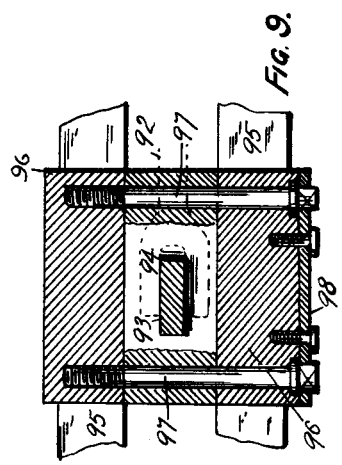
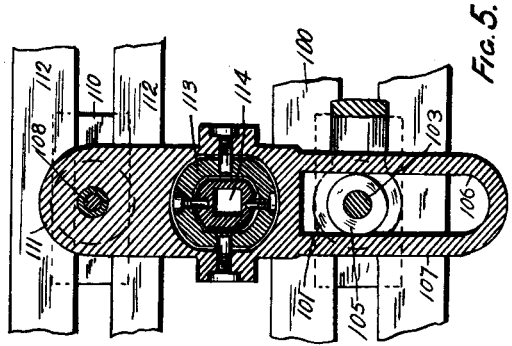
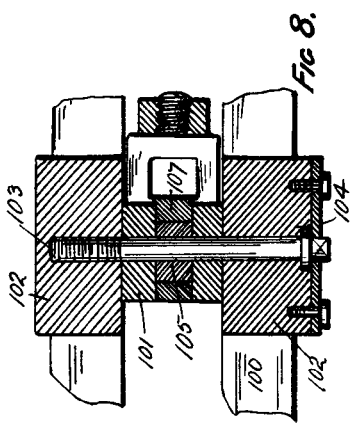
WITNESSES:
INVENTOR:
Alfred Roberto Pullen
BY
Wm Wallace White
ATTY

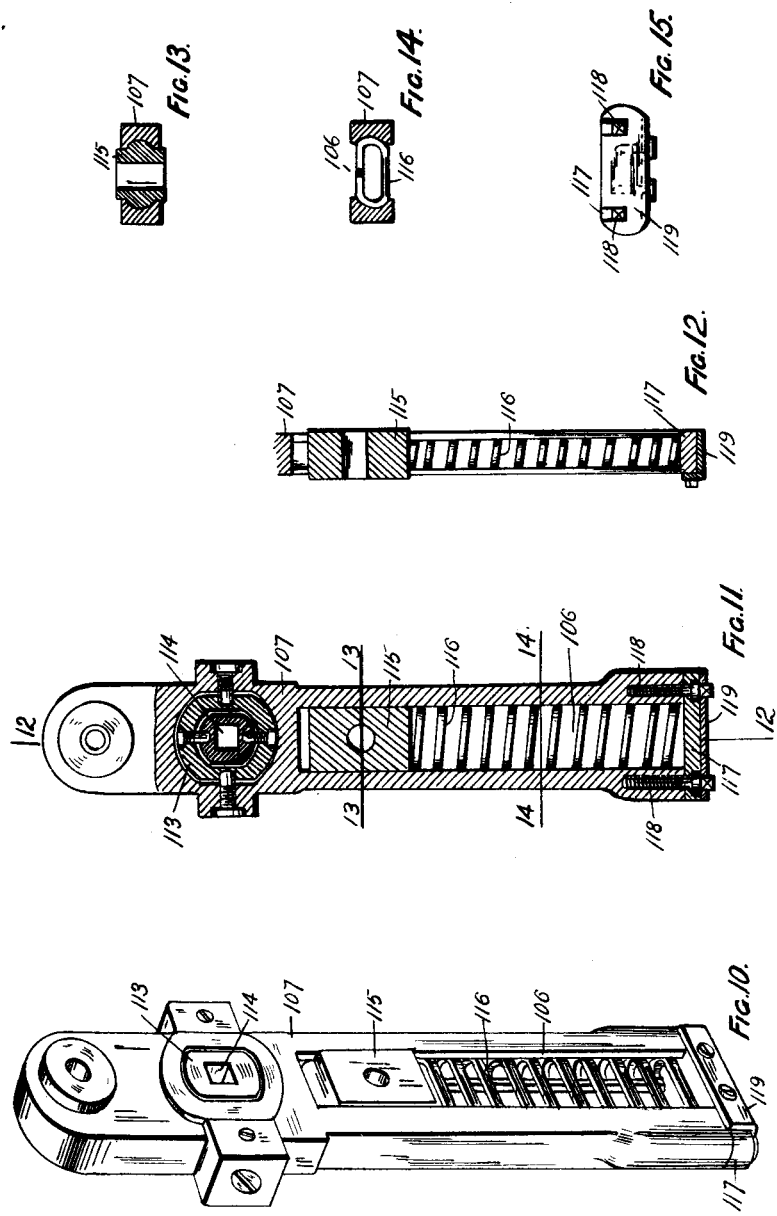

A. R. PULLEN.
METHOD OF PROPELLING SHIPS AND BOATS AND APPARATUS THEREFOR.
APPLICATION FILED MAY 21, 1913.
1,116,117.
Patented Nov. 3, 1914.
17 SHEETS—SHEET 6.
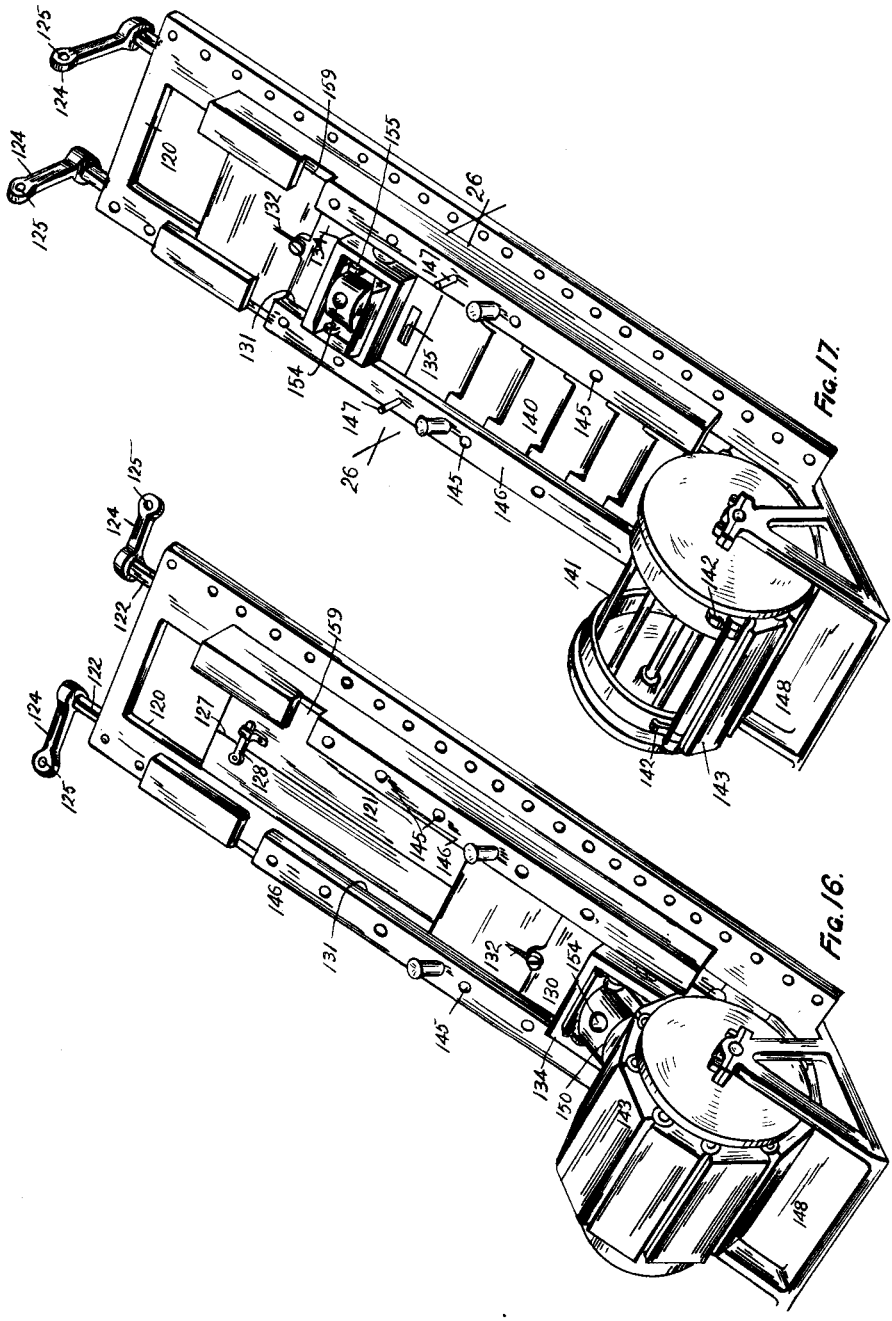

A. R. PULLEN.
METHOD OF PROPELLING SHIPS AND BOATS AND APPARATUS THEREFOR.
APPLICATION FILED MAY 21, 1913.
1,116,117.
Patented Nov. 3, 1914.
17 SHEETS—SHEET 7.
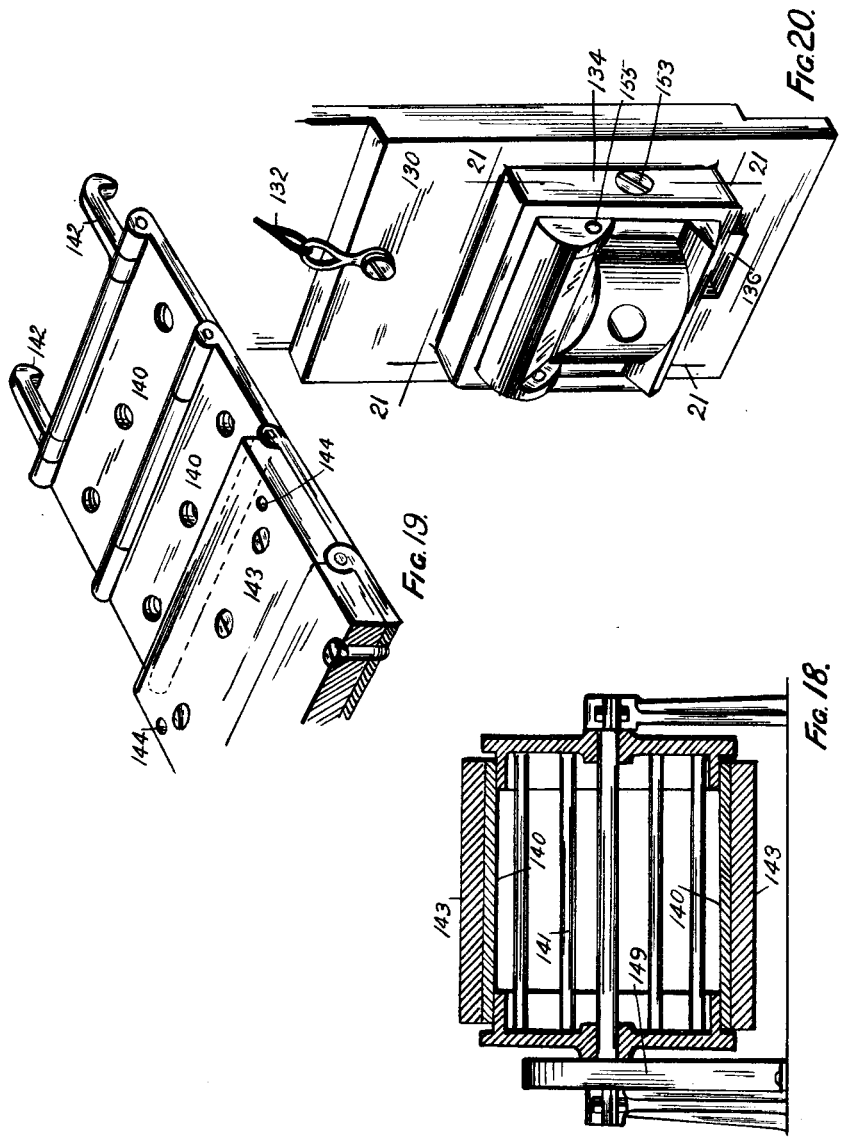

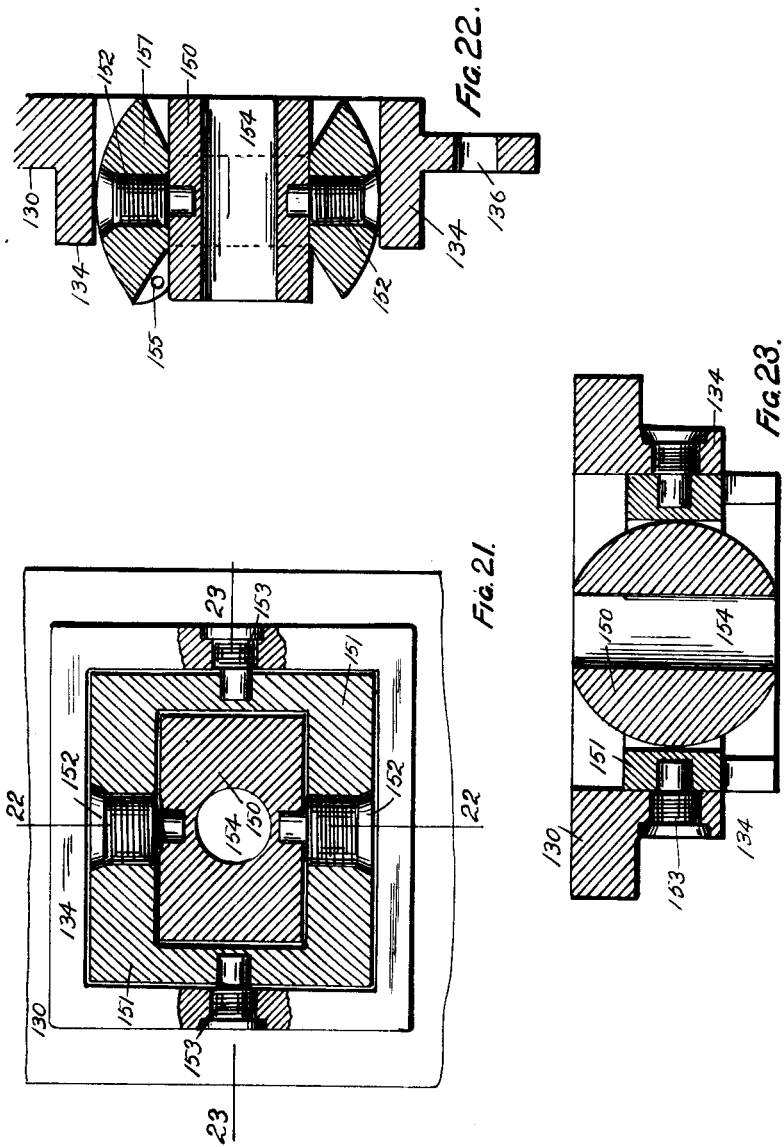

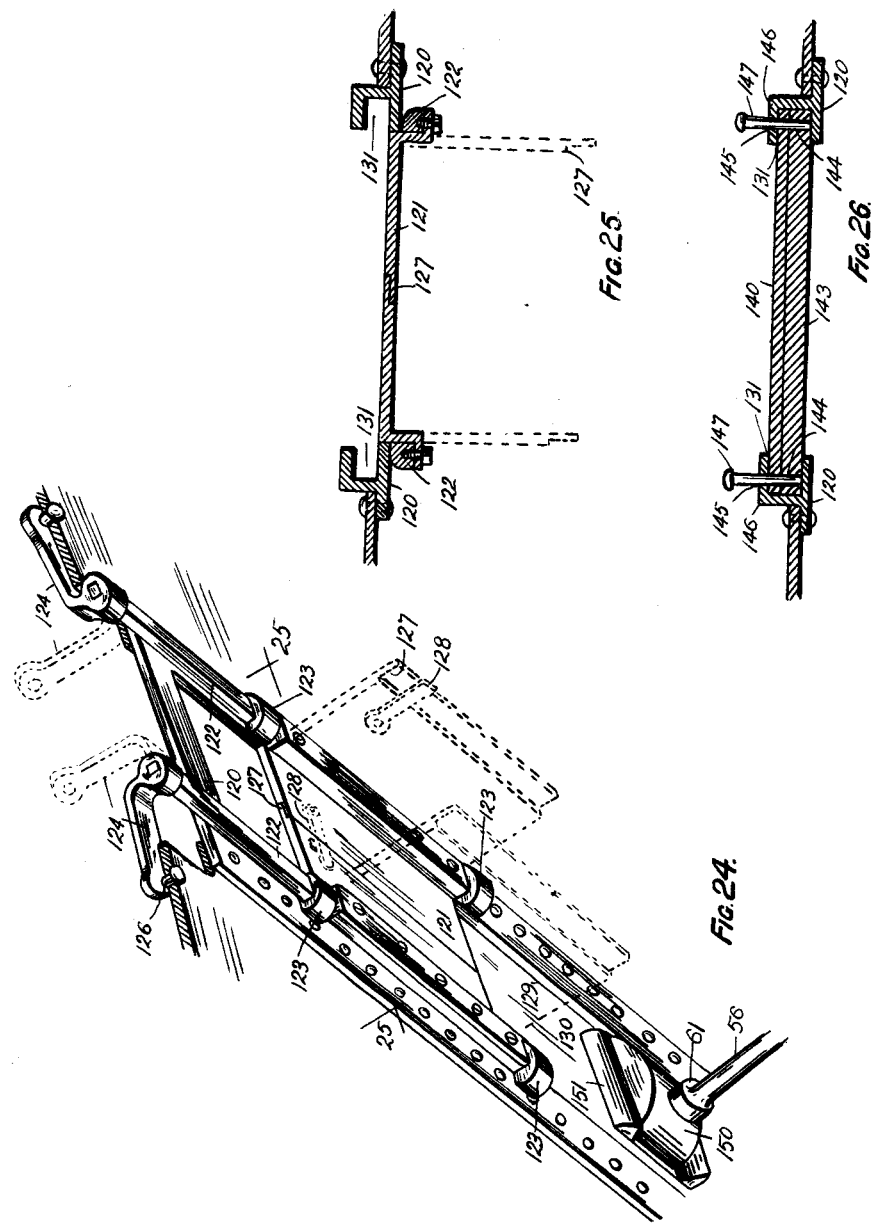

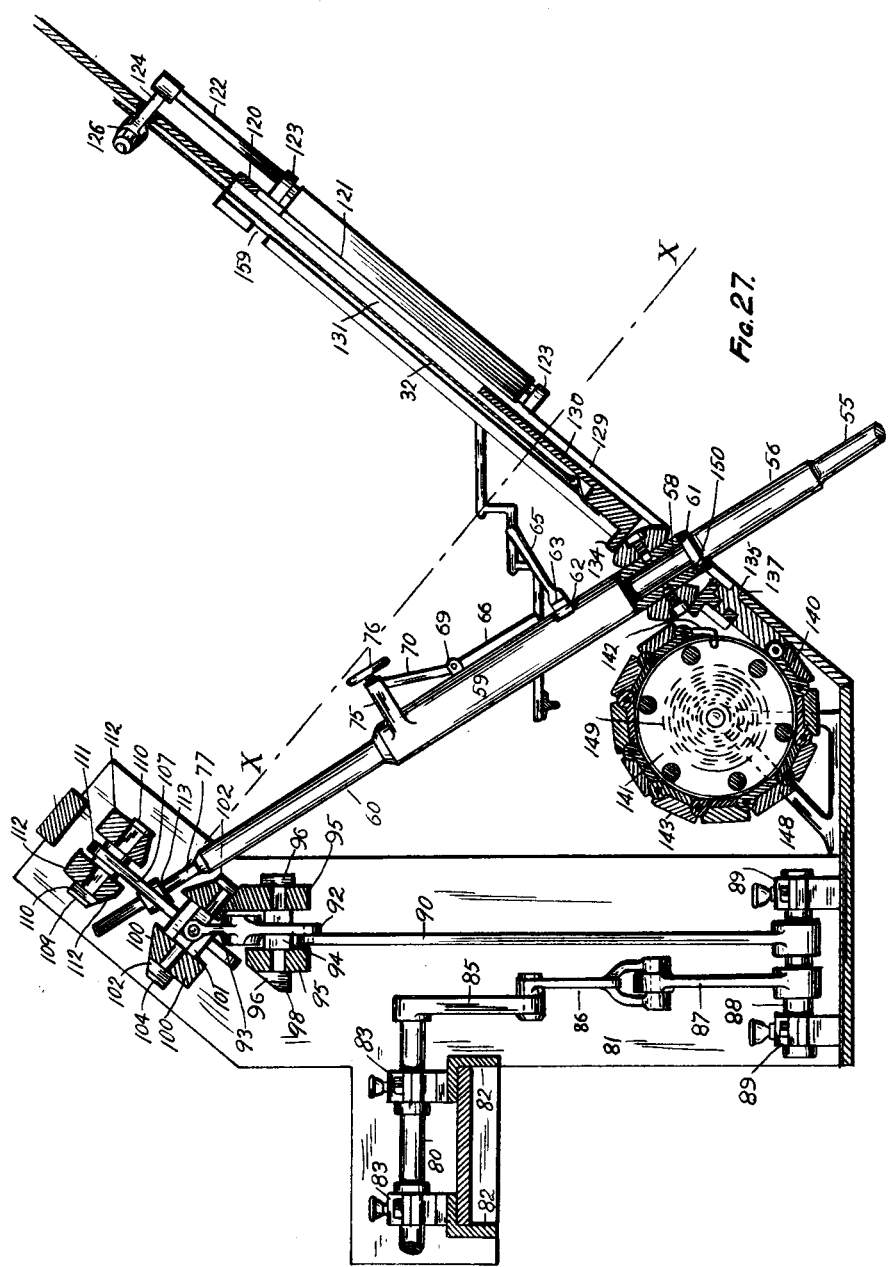

A. R. PULLEN.
METHOD OF PROPELLING SHIPS AND BOATS AND APPARATUS THEREFOR.
APPLICATION FILED MAY 21, 1913.
1,116,117.
Patented Nov. 3, 1914.
17 SHEETS—SHEET 11.
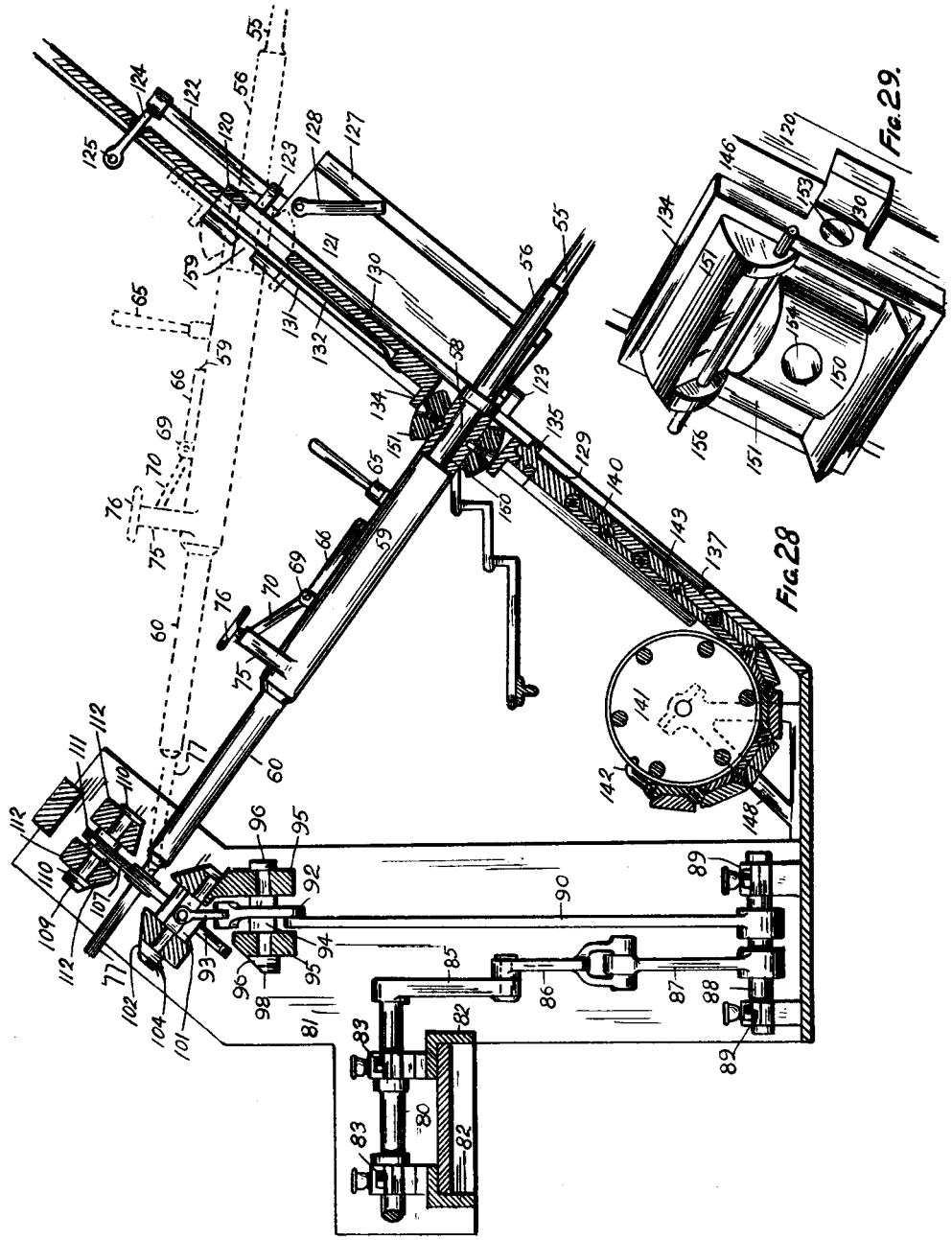
WITNESSES:
John C. Sanders
Albert F. Heuman
INVENTOR:
Alfred Roberto Pullen
BY Wm. Wallace White
ATT'Y

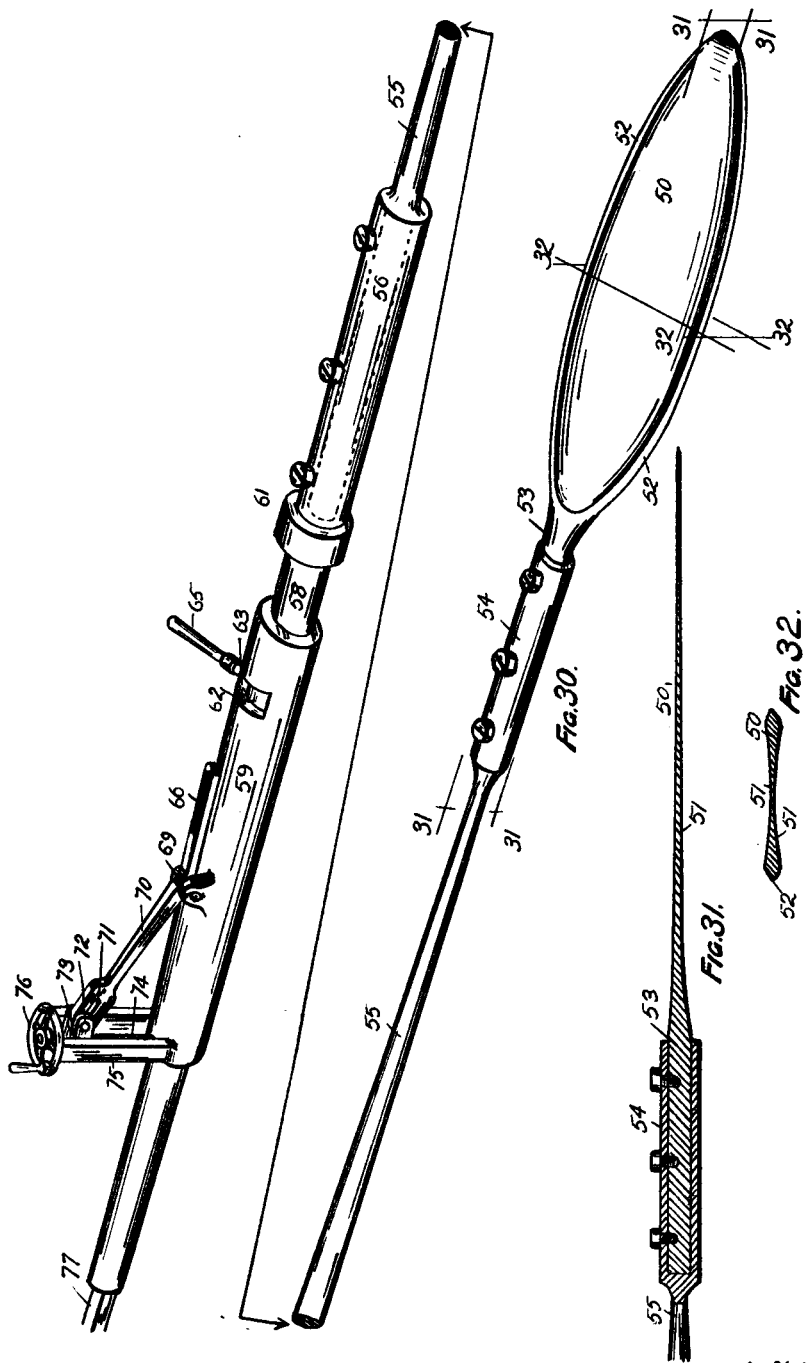

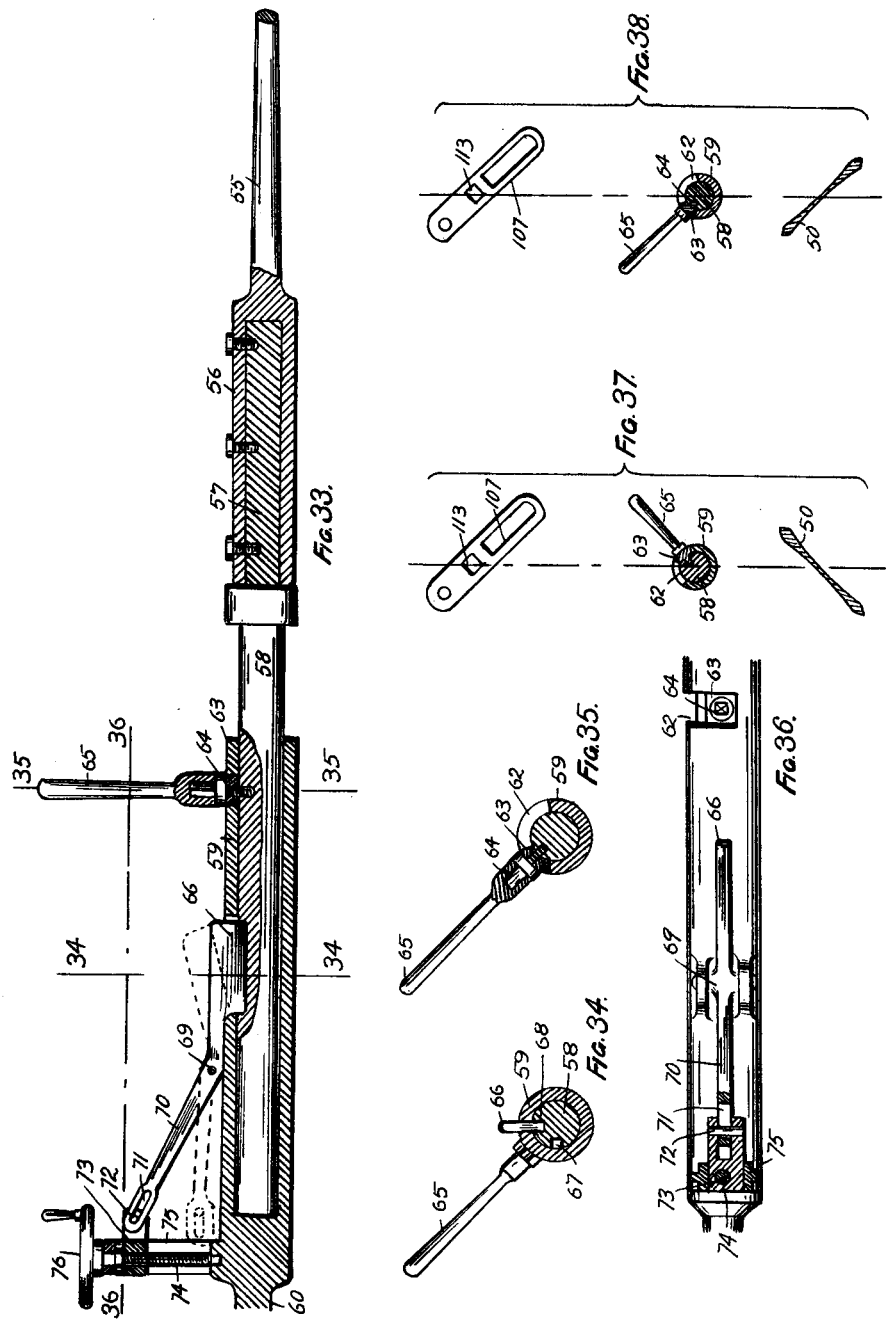

A. R. PULLEN.
METHOD OF PROPELLING SHIPS AND BOATS AND APPARATUS THEREFOR.
APPLICATION FILED MAY 21, 1913.
1,116,117.
Patented Nov. 3, 1914.
17 SHEETS—SHEET 14.
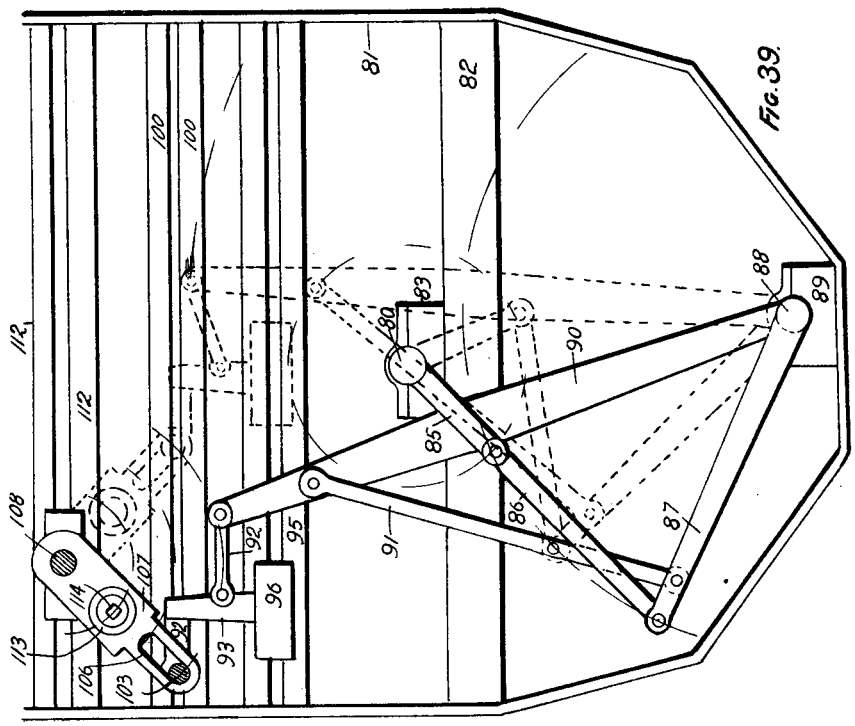
WITNESSES:
John C. Sanders
Albert F. Heyman
INVENTOR:
Alfred Roberts Pullen
BY
Wm. Wallace White
ATT'Y.

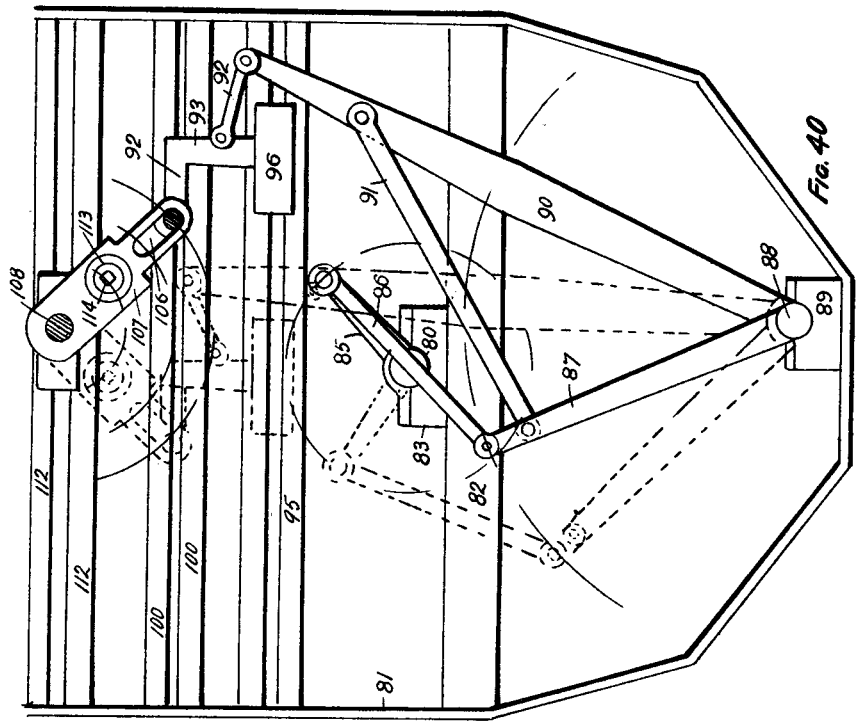

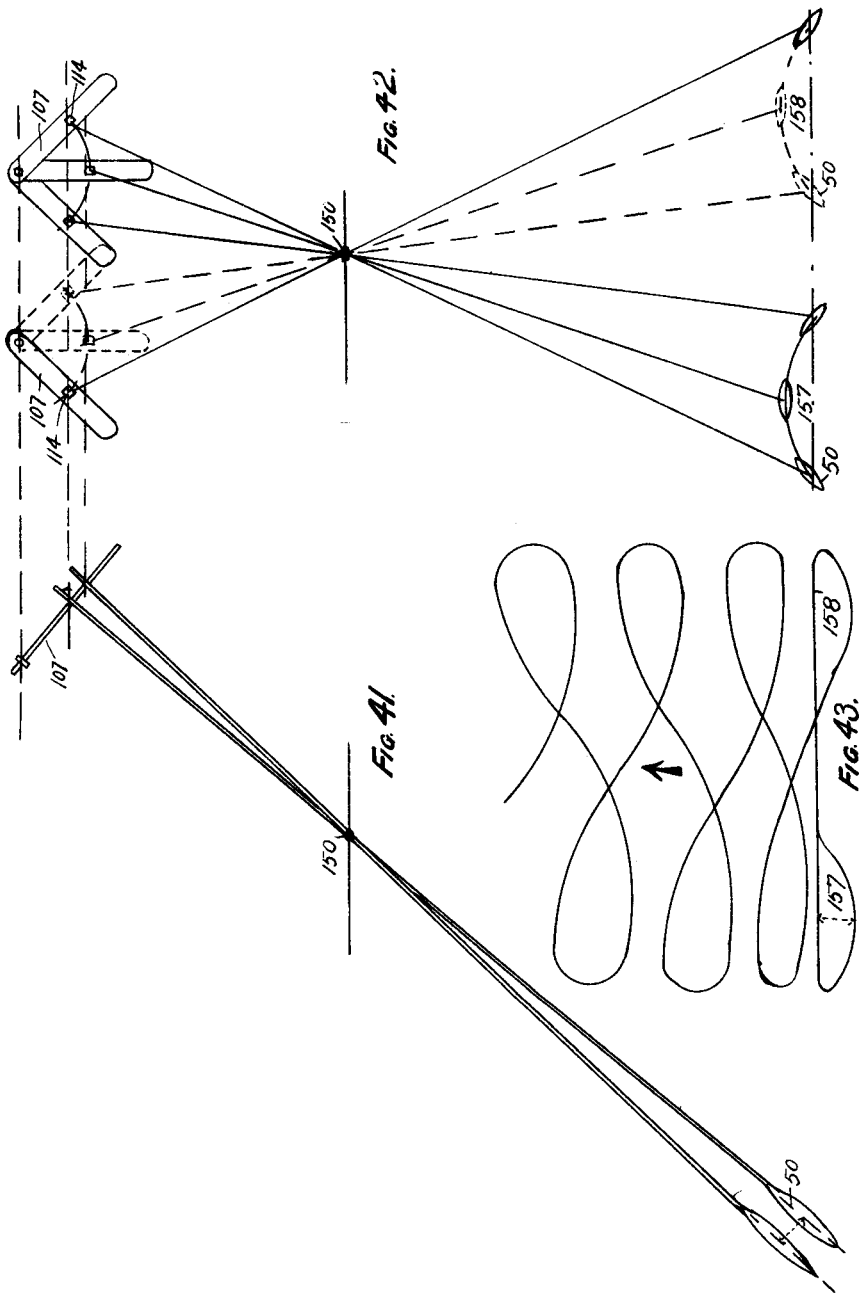

A. R. PULLEN.
METHOD OF PROPELLING SHIPS AND BOATS AND APPARATUS THEREFOR.
APPLICATION FILED MAY 21, 1913.
1,116,117.
Patented Nov. 3, 1914.
17 SHEETS—SHEET 17.
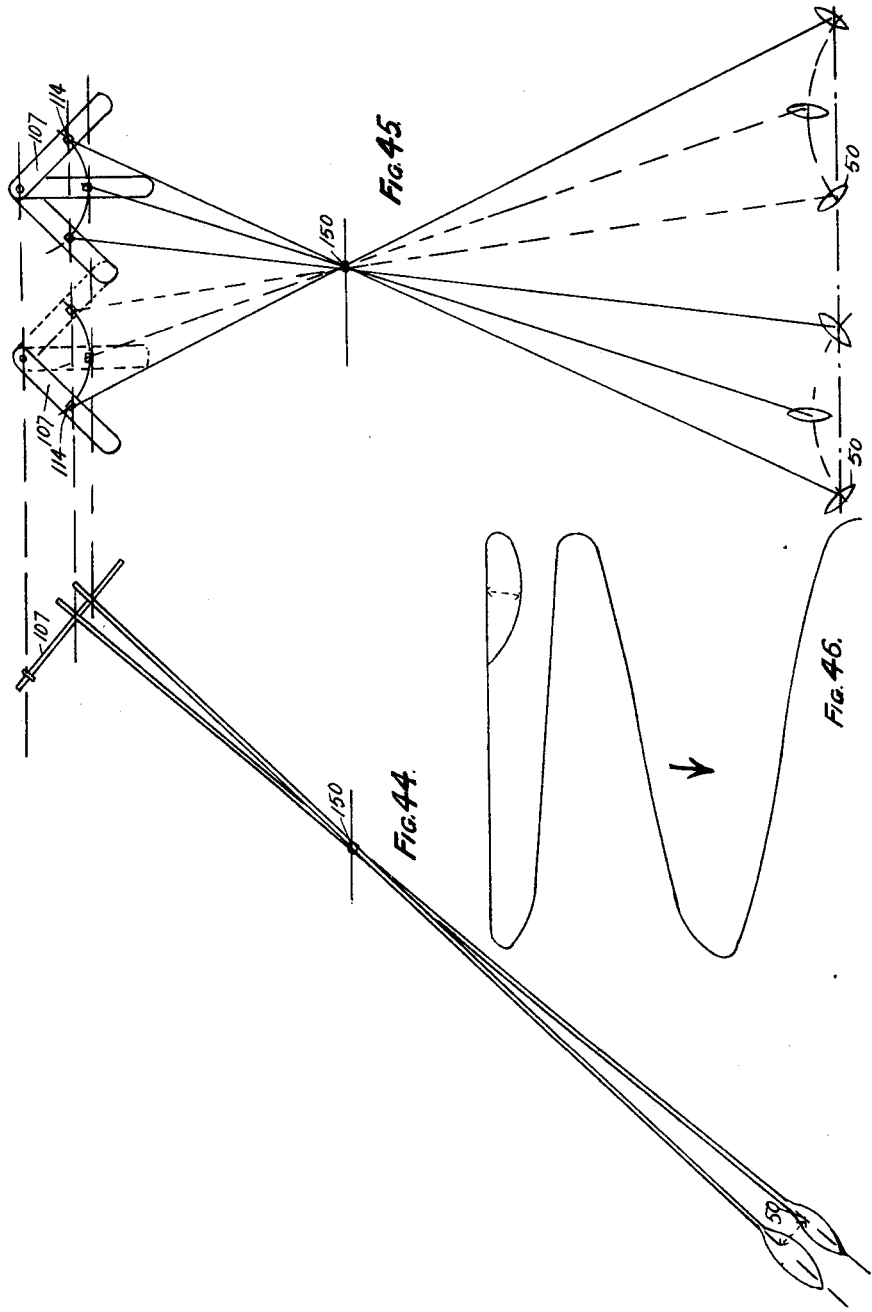
WITNESSES:
John C. Sanders
Albert F. Heuman
INVENTOR:
Alfred Roberto Pullen
BY Wm. Wallace White
ATT'Y

UNITED STATES PATENT OFFICE.

ALFRED ROBERTO PULLEN, OF HILL-TOP CRESCENT, MANLY, NEAR SYDNEY, NEW SOUTH WALES, AUSTRALIA.

METHOD OF PROPELLING SHIPS AND BOATS AND APPARATUS THEREFOR.

1,116,117.  Specification of Letters Patent.  Patented Nov. 3, 1914.

Application filed May 21, 1913. Serial No. 768,915.

*To all whom it may concern:*

Be it known that I, ALFRED ROBERTO PULLEN, a subject of the King of Great Britain, residing at "La Brunette," Hill-Top Crescent, Manly, near Sydney, in the State of New South Wales and Commonwealth of Australia, inventor, have invented a new and useful Improved Method of Propelling Ships and Boats and Apparatus Therefor, of which the following is a specification.

This improved method of propelling ships and boats and apparatus therefor is equally applicable to ocean going craft and to boats and has been specially devised in order to provide a method and apparatus which is of greater advantage in almost every aspect than existing methods of marine propulsion.

This improved method of propelling ships and boats is an application to such craft of an approximate model of nature's method of propulsion through water by means of the tail of a fish and of propulsion through air by means of the wings of a bird. And this improved method of propelling ships and boats is characterized by the use of an instrument extruding from the stern of the ship or boat into the water and which is lashed or oscillated or given such motion by connection to ordinary prime motors or engines or mechanism that it propels or imparts stern way to the vessel similarly to an ordinary bow or stern oar or scull manipulated in a boat. And the motion of this instrument or scull in one direction, say propelling, will cause the point thereof to describe in the water a series of curves which when observed from above approximate to the shape of the numeral 8 transversely across the track of the craft while in the opposite direction or say imparting stern way, the motion will cause the point of the scull to describe in the water a series of curves which when observed from above approximate to the shape of successive letters S transversely across the track of the craft.

The propeller itself is the scull extruding longitudinally and diagonally from one end of the ship or boat into the water for some considerable distance below the keel. It is elastic or yielding throughout and has concave surfaces on both sides transversely with tapered edges and is of narrow oval outline while tapering longitudinally to a thin rounded point. And it is oscillated or lashed from side to side by apparatus or mechanism hereinafter described connected up to a prime motor or engine of any approved construction. Being elastic or yielding this scull will adapt itself to the variable resistance of wave motion below the surface of the water and its concave surfaces and tapered edges enable it to obtain a good grip on the water. The scull is positioned with a longitudinal dip of preferably about 30° to 40°. For forward progression the scull in its initial position is in a line with the longitudinal center of the boat or vessel with the blade horizontal. When the operating mechanism is set in motion an oscillating holder turns the scull until the blade has a pitch of preferably about 45° from its horizontal position and with its forward edge lowermost. This oscillator is traveled horizontally transversely of the vessel to one of the terminal points of its travel thus moving the blade of the scull correspondingly in the opposite direction and upon reaching the point of its travel it is caused to rotate a full quarter turn thus turning the blade of the scull about its longitudinal axis and so positioning the other (and now forward) edge of the blade undermost with a pitch of about 45° (and 90° from its first position). It is then traveled a full half stroke when upon reaching the opposite terminus of its travel the oscillator is returned a quarter turn thus bringing it to the first described operative position. Upon the turning of the blade about its longitudinal axis at each terminus of the travel of the oscillator the blade by reason of its pitch and assisted by its flexible properties describes a loop and by reason of the progression of the vessel the point of the blade upon each full stroke describes a form approximating to a figure of 8. Each edge of the blade has thus been traveled and returned though a full quarter turn (having passed through an arc of 45° above and 45° below a horizontal plane) at each terminus of the oscillator and throughout the stroke an inclined surface is presented to the water and this in conjunction with the resiliency of the blade causes a continuously thrusting and screw like effect and so progresses the boat or vessel. When it is desired to move the boat or vessel stern foremost the blade of the scull is freed from its shaft and given a full quarter turn in relation to said shaft about its longitudinal axis and again locked thus securing it in a vertical plane in its initial position. Upon operation of the oscillator the blade is again given a pitch of about 45° but now with its uppermost edge forward (or 90° from its thrusting position) and it is so moved until it reaches the end of its travel or terminus when the blade is turned through a full quarter turn by the oscillator as before described. The blade still having a pitch of about 45° but in the opposite direction (thus again placing the uppermost edge of the blade forward) is then traveled until it reaches the opposite terminus. In this action it will be seen that the same edge of the blade is continuously uppermost thus causing it to form an S like curve upon each full stroke. Each edge of the blade is thus again traveled through a full quarter turn at each terminus of the oscillator, but in this instance the edge passes through an arc of 45° upon each side of a vertical plane. It will be seen that by turning the blade from the horizontal plane to the vertical plane its pitch is reversed and a directly opposite effect produced. By an adjustment of the oscillator the angle of the pitch of the blade might be adjusted, but 45° to meet variable conditions has been stated as an example for ordinary propulsion. And this scull is so rigged that in case of damage to it it can be easily drawn inboard of the craft and repaired or replaced without the necessity of docking the craft. The apparatus or mechanism for imparting the necessary lashing or transversely oscillating motion to this scull is characterized by the fact that it need not be reversed and that it has a reciprocating universal holder (for the inner end of the scull) on a similarly reciprocating fulcrum and is adapted to partially rotate the scull at each reciprocation and this mechanism has a suitable framing and guide rods across the same for the reciprocating parts. The scull extrudes from the end of the vessel through a universal fulcrum which is fast to that end or has supporting devices adapted also to close the openings in the vessel allowing such adjustment.

In the drawings accompanying and forming part of this complete specification is illustrated this improved method of propelling ships and boats and the now best known apparatus suitable therefor.

Figure 1 is a perspective view of the apparatus according to this invention for propelling a ship or boat installed in a craft of considerable size there not being shown in connection therewith the prime motor of the same which may be of any approved kind but is preferably a turbine engine of modern construction nor is the rudder shown which would be one of well known construction boxed in the keel of the vessel. Fig. 2 is an enlarged perspective view of the mechanism for oscillating or lashing the scull. Fig. 3 a further enlarged view of parts thereof and Fig. 4 is a sectional view taken on the plane 4—4 in Fig. 3 while Figs. 5, 6, 7, 8 and 9 are sectional views on the respective planes indicated by similar numbers in Fig. 4. Fig. 10 is a perspective view of a modified construction of the scull operator of the oscillating mechanism and Fig. 11 a vertical section thereof while Figs. 12, 13 and 14 are sectional views on the lines indicated by similar numbers in Fig. 11, and Fig. 15 is a reverse plan of the same. Figs. 16 and 17 are perspective views of the scull holder or universal joint and its adjustable supporting framing showing different positions of the parts. Fig. 18 is a section of the spring winding barrel of such framing. Figs. 19 and 20 are enlarged perspective views of other parts thereof and Figs. 21, 22 and 23 are sectional views on planes or lines indicated by similar numerals in Figs. 20 and 21. Fig. 24 is an external perspective view of the universal holder and adjustable supporting framing with gates thereon in closed position though shown by dotted lines in open position. Fig. 25 is a sectional view on plane 25 in Fig. 24 and Fig. 26 a similar view on plane 26 in Fig. 17. Figs. 27 and 28 are side elevations of the oscillating mechanism and adjustable supporting framing with the scull in a low or deep and in a higher position respectively. And Fig. 29 is a perspective view of the universal holder for the scull. Fig. 30 is a perspective view of the propelling instrument or scull in two parts and Figs. 31 and 32 sectional views on respective planes in Fig. 30 having similar numerals. Fig. 33 is a sectional view of part of such scull and Figs. 34, 35 and 36 sectional views on the planes in Fig. 33 similarly numbered. Figs. 37 and 38 are diagrammatic views illustrating the relative positions of the controlling handle the oscillating operator and the scull blade in ahead and astern positions respectively. Figs. 39 and 40 are diagrammatic views of the oscillating mechanism in ahead and astern positions respectively. Figs. 41 and 42 are diagrammatic views illustrating the motion of the oscillating operator and the scull in ahead position and Fig. 43 shows approximately the path of the point of the scull observed from above in such ahead position. And Figs. 44, 45 and 46 are similar views of the same in the go-a-stern positions.

The propelling instrument or scull is particularly illustrated in Figs. 30 to 36 and consists of an oval shaped tapered blade 50 with both faces 51 hollowed or concaved transversely to prevent or minimize slip or loss of thrust and it has beveled edges 52 to minimize resistance to passage through the water. This blade 50 has a shank 53 taking into the socket 54 (and firmly secured therein) of the somewhat flexible or elastic outer stem 55 which also has a socket 56 to receive the reduced end 57 of the middle shaft 58. This middle shaft 58 fits in a socket 59 of the inner stem 60 which thrusts (by collar 61) and fits against the universal holder 150. The outer stem 55 and the middle shaft 58 are locked together and the latter is locked to the inner stem 60 through radial slot 62 in the inner stem 60 through which passes a detachable block 63 fast to said shaft 58 and having a square headed screw bolt 64 on which may be fitted a lever 65. The middle shaft 58 is further locked to the inner stem 60 by a trigger key 66 taking into either of the key ways 67 or 68 in said middle shaft 58. This trigger key 66 is pivoted at 69 and has in its operating arm 70 a slot 71 in which takes the pin 72 of a slide block 73 on a screw 74 in the bracket 75 affixed to the middle shaft 60. By means of a tool or say a hand wheel 76 the arm 70 is operated to withdraw the key 66 from one or other of the ways 67 or 68 and to replace it therein. The inner stem 60 has an elongated rectangular shank 77 adapted to take into the rectangular orifice 114 of the universal holder 113 of oscillator 107.

The operating mechanism for the purpose of oscillating or lashing the scull is particularly illustrated in Figs. 2 to 9 and it is connected with any approved engine giving rotatory motion in any ordinary manner and whose transmission shaft is marked 80. This mechanism is conveniently positioned within a somewhat U shaped framing 81 affixed in any well known way to the frame of the vessel. Transversely of this framing 81 are bearers 82 having bearings 83 for the transmission shaft 80. On the end of shaft 80 is a crank arm 85 with a connecting link 86 to the radial arm 87 fast to a lay shaft 88 in bearings 89 at the base of the framing 81. Fast also to this lay shaft 88 is another radial arm or rocking lever 90 rigidly connected to the arm 87 by stay or strut 91. A link 92 connects the top end of the rocking rod 90 to the vertical extension 93 of the slide bracket 94 riding on the transverse guide bars 95 and held on said guide bars 95 by side cheeks 96 (fastened by screw bolts 97 and a lock plate 98). These bars 95 are affixed to the brackets 99 of the framing 81. The inner one of the upper guide bars 95 forms one of another set of similar guide bars 100 set parallel in a vertical plane but obliquely in a horizontal plane relatively to the guide bars 95 across the framing and supporting a slide block 101 connected to the vertical extension 93 of slide bracket 94. The slide block 101 has side cheeks 102 secured thereto by screw bolt 103 and a lock plate 104 by which the block is held in position on the guide bars 100. The fastening screw bolt 103 supports a roller 105 centrally in the block 101. The slot 106 of an oscillator bridle 107 takes over the roller 105 and this bridle is fulcrumed on the screw bolt 108 provided with a lock plate 109, of the side cheeks 110 of the slide block 111 which works on the guide bars 112 set parallel to the guide bars 100. The oscillator bridle 107 holds about midway a universal bearing or holder 113 having a rectangular orifice 114 for the rectangular shank of the inner stem 60 of the scull.

To provide against concussion of the roller 105 on the bottom of the bridle slot 106, (especially in heavy craft) a modification of the oscillator bridle 107 is shown in Figs. 10 to 15. In this construction the slot 106 is extended and instead of a roller 105 it has a slide block 115 a cushion spring 116 and a bridge plate 117 secured by bolts 118 with a lock plate 119.

It is necessary for the scull with its squared inner stem in the universal holder 113 of the oscillating bridle 107 to have a suitable fulcrum through which to extrude into the water and that this fulcrum though fast should have a universal bearing; and it is further convenient and almost necessary that this fulcrum should be adjustable as to height from the water and so a suitable supporting framing has been devised which is particularly illustrated in Figs. 1 and 16 to 29. Into the stem frame of the vessel (above the water line) is built the rectangular frame 120 with upper half doors 121 hinged on shafts 122 in bearings 123 having at the top ends arms 124 provided with orifices 125 for the reception of bolts 126 which lock said arms 124 to the vessel's framing and render the rabbeted joint 127 of the two half doors water-tight though said doors 121 have also locking catch 128. The lower portion of the opening 129 in the frame 120 is closed by a slidable plate or shield 130 adapted to run in grooves 131 made on the frame 120. This plate 130 is connected by a rope or chain 132 to an overhead winch 133 which may be positioned on a convenient platform or lower deck or upon the upper deck as shown in Fig. 1 and it also has a boxing 134 for the universal fulcrum 150. Attached to the bottom of this plate or shield 130 by a cross shaped hook 135 taking into the orifice 136 is a rollable shutter. The hook 135 takes against the bottom end 137 of the slot 129 when the universal fulcrum 150 is in its lowest position. The shutter consists of a plurality of hinged plates 140 adapted to roll or wind around a drum or barrel 141 and anchored thereto by the hooks 142. On these hinged plates 140 are liners 143 so shaped that when drawn upwardly into the framing 120 water tight joints between them are obtained.

A series of orifices 144 are provided in the shutter to register with orifices 145 in the lips 146 of the groove 131 so that pins 147 may be inserted to rigidly hold said shutter on the frame 120 when in any raised position other than its lowest. The drum or barrel 141 has its axle bearings in brackets 148 fixed to framing 81 and it is spring controlled having a spring 149 which unwinds as the shutter is elevated and whose recoil on the shutter being released above will lower the same. The universal fulcrum 150 comprises a bearing 154 held in frame 151 by trunnions 152 and this frame 151 is held by trunnions 153 in boxing 134 and through its bearing 154 the scull passes. Orifices 155 are provided for the insertion of a rod 156 when it is required for tackle to ship the scull in-board.

In operation the bridle 107 having imparted to it the lashing or oscillating motion being itself moved transversely to and fro across the vessel and its fulcrum 113 moved transversely likewise at the end of each oscillation and the scull having a non-rotatory fixture in said bridle 107 and a free bearing in the universal fulcrum 150 the oval portion or blade 50 is passed through the water similarly to the oar or scull of a boatman and approximately as a bird uses its wings in the air and a fish its tail in the water and so propels the vessel.

When motion is given by shaft 80 by means of crank 85 connecting rod 86 and radial arms 87 and 90 to the sliding bracket 94 this causes the bridle 107 to move on its fulcrum 108 from the full line positions to the dotted lines positions as the case may be as shown in Figs. 39 and 40 and at the same time toward the end of each reciprocation of the arm 90 to swing the bridle 107 from one to the other of its dotted and full lines positions. Taking the relative positions of the oscillator bridle 107 reversing handle 65 and blade 50 as shown in Fig. 37 the sliding fulcrum 108 of the oscillator bridle 107 as shown in full lines remains stationary until the arm 90 swings said bridle 107 from the full lines position to the position shown in dotted lines as shown in Fig. 39 and this causes the blade 50 to make a loop 157 in the water (see Figs. 42 and 43). The bridle 107 is then oscillated by the lever 90 from the position shown in full lines (Fig. 40) and again is swung over into the position in dotted lines causing the blade 50 to make another and opposite loop 158 (Figs. 42 and 43) propelling the vessel ahead and as the vessel's way increases the loops enlarge and by virtue of the elasticity of the stem of the scull become larger until finally approximately forming the figure 8. The cause of the formation of these loops is the oscillator bridle 107 being swung on its fulcrum point 108 (see Figs. 41 and 42) and the universal bridle 113 making an arc of movement and partially rotating the inner stem 60 of the scull which being pivotally mounted in the universal fulcrum 150 imparts to the oscillating blade 50 a similar arc of movement. The transverse length of these loops depend of course upon the distance between the universal fulcrum 150 and the describing edge of the oval blade 50 and the curving contour is brought about by the flexibility and elasticity of the whole scull. Similarly as loops 157 and 158 are made in the ahead movement as soon as the vessel moves astern the loops 157 and 158 are not completed (see Fig. 46) but the tip of the scull makes a zig zag movement and takes a transversely S shape course by reason of the elasticity of the scull and it is this absence of the loops or these not being completed that cause the "astern" movement of the vessel. Figs. 37 and 38 show the relative positions of the oscillator bridle 107 reversing handle or lever 65 and the sculling blade 50 to one another. In the go-a-head positions (Fig. 37) the handle 65 and the blade 50 sit at right angles to the oscillating bridle 107 (the key 66 being in the way 67) and in the going astern positions (Fig. 38) oscillator bridle 107 the handle 65 and blade 50 are parallel to one another. The change of positions is accomplished by withdrawing key 66 from way 67 by means of screw 74 and hand wheel 76 turning the lever 65 and the shaft 58 and lowering the key 66 into the way 68 to lock the scull stem in this reverse position.

The scull is extruded from the vessel at an angle preferably of 40° with the vertical and it is so set in its lowermost position as shown in Fig. 27 with the opening 129 closed in by the half doors 121 and shield 130. In shallower water it may be necessary to raise the scull in order to prevent the blade 50 from fouling. And in this case a rope or chain 132 is led from the winch 133 to the plate 130. Said winch 133 being operated the shield 130 carrying the universal fulcrum 150 and the rollable shutter will be raised to the distance required and locking pins 147 being inserted the universal fulcrum 150 is given a stable position. If it be desired to raise the scull to a position higher than dotted line X—X (in Fig. 27) which is the limit of elevation thereof without opening the doors 121 then the doors 121 are opened care being taken that as the scull is lifted beyond this point the square shank 77 of the scull does not leave the universal bridle holder 113.

When it is necessary to have the scull inboard as say to effect repairs thereto or to replace it by another scull its universal fulcrum 154 is raised as before set forth to the dotted lines position (Fig. 28) when the trunnions 153 of the universal fulcrum are in register with the two openings 159 and is fixed in this position by means of locking pins 147. The lever 65 with its block 63 is then removed and the trunnions 153 withdrawn from the universal fulcrum allowing the inner stem 77 to be withdrawn through the universal holder 113. The scull is then hauled half way in-board and the trigger key 66 is then raised and the middle shaft 58 and outer stem 55 slid off and drawn inboard with the universal fulcrum. The replacing in position of a new propeller is effected by reversing the above sequence of procedure.

A bar or rod 156 may be inserted through the orifices 155 of the universal fulcrum after the trunnions 153 are removed and said bar prevents the universal fulcrum 150 from slipping outwardly and provides a convenient handling part. Repairs and replacements may thus be effected without the necessity of docking a vessel for such purposes.

A platform or platforms are provided in or about the framing 81 for the convenience of the attendants and of workmen one of which 160 is shown in Fig. 1.

It is to be understood that the mechanical details described with reference to the drawings are those which as far as is at present known are the best for performing the purposes in respect to which they have been propounded but these details may be varied and modified or have equivalent substitutes without departing from the essence and scope of this invention.

What I claim as my invention and desire to secure by Letters Patent is:—

1. In apparatus for propelling ships and boats mechanism for lashing or oscillating the oar or blade extruding through a universal fulcrum in the end of a vessel comprising a transmission shaft from an engine, a rocking lever actuated thereby, a slide bracket operatively connected to said rocking lever, an oscillator bridle actuated by said slide bracket, and a universal shank holder carried by said bridle substantially as herein described and explained.

2. In apparatus for propelling ships and boats mechanism for lashing or oscillating a fulcrumed oar or blade extruding from the end of a vessel having an oscillator bridle mounted on a sliding fulcrum with a universal shank holder adapted to be reciprocated transversely and to be swung on its sliding fulcrum substantially as herein described and explained.

3. In apparatus for propelling ships and boats means for supporting the universal fulcrum of an extruding oar or scull from the end of a vessel and for closing said vessel end, comprising a frame with doors or closures, a sliding shield holding said universal fulcrum and a rollable shutter substantially as herein described and explained.

4. In apparatus for propelling ships and boats mechanism for supporting the universal fulcrum of an extruding oar or scull from the end of a vessel and for closing said vessel end, comprising a frame with doors or closures, a sliding shield holding said universal fulcrum, a rollable shutter and a spring for returning said shutter to its inoperative or rolled up position, substantially as herein described and explained.

5. In apparatus for propelling ships and boats the scull comprising an oval blade 50 with hollow faces 51, a shank 53, a flexible outer stem 55, a middle shaft 58 and an inner stem 60 with shank 77 substantially as herein described and explained and as illustrated in the drawings.

6. In apparatus for propelling ships and boats a scull comprising an oval blade 50 with hollow faces 51, a shank 53, a flexible outer stem 55, a middle shaft 58 having a fast block 63 and key ways 67 and 68, an inner stem 60 having a radial slot 62 and a withdrawal key 66 and devices for withdrawing and replacing said key 66 in either of said key ways 67 and 68 substantially as herein described and explained and as illustrated in the drawings.

7. In apparatus for propelling ships and boats a scull comprising an oval blade 50 with hollow faces 51, a shank 53, a flexible outer stem 55, a middle shaft 58 having a fast block 63 and key ways 67 and 68, an inner stem 60 having a radial slot 62, a pivoted trigger key 66 having an operating arm 70, a screw block 73 and a screw 74 in a bracket 75 and a device for rotating such screw 74 substantially as herein described and explained and as illustrated in the drawings.

8. In apparatus for propelling ships and boats in combination with a rocking lever 90, guide bars 95, a slide bracket 94 connected to said lever and engaging said guide bars, sets of guide bars 100 and 112, slide blocks 101 and 111 respectively mounted thereon and an oscillator bridle 107 with a universal holder 113 connected to said slide blocks, one of said blocks being operatively connected to said slide bracket, substantially as herein described and explained and as illustrated in the drawings.

9. In apparatus for propelling ships and boats a rectangular frame 120, doors 121 adjacent the upper end thereof, a shield 130 slidably mounted on said frame, a universal fulcrum 150 carried by said shield and a rollable shutter of hinged plates 140 having one of its ends connected to said shield, substantially as herein described and explained and as illustrated in the drawings.

10. In apparatus for propelling ships and boats, a rectangular frame 120, doors 121 adjacent the upper end thereof, a shield 130 slidingly mounted on said frame, a universal fulcrum 150 carried by said shield, a rollable shutter of hinged plates 140 having one of its ends connected to said shield, means for moving said shield and shutter relatively to said frame, and means for holding said parts in their adjusted position substantially as herein described and explained.

In testimony whereof I have signed my name to this specification in the presence of two subscribing witnesses.

ALFRED ROBERTO PULLEN.

Witnesses:
PERCY NEWELL,
H. R. HILL.